Figure 1:

Jan. 18, 1927.

S. C. ANKER-HOLTH 1,614,587

FISH CLEANING MACHINE

Original Filed June 7, 1922   2 Sheets-Sheet 1

Jan. 18, 1927.
S. C. ANKER-HOLTH
1,614,587
FISH CLEANING MACHINE
Original Filed June 7, 1922   2 Sheets-Sheet 2
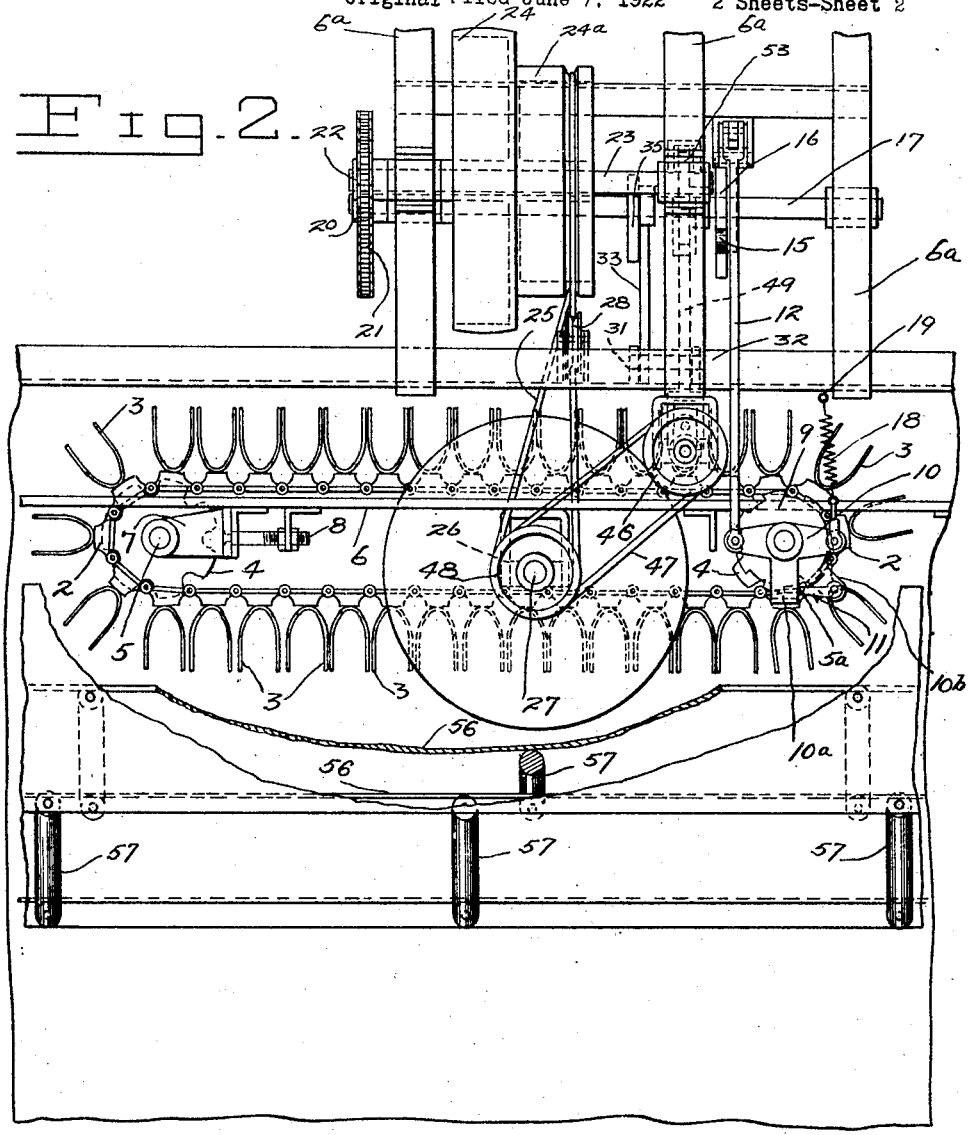
Inventor.
Severin C. Anker-Holth
By
His Attorney.

Patented Jan. 18, 1927.

1,614,587

UNITED STATES PATENT OFFICE.

SEVERIN C. ANKER-HOLTH, OF LOS ANGELES, CALIFORNIA.

FISH-CLEANING MACHINE.

Application filed June 7, 1922, Serial No. 566,461. Renewed June 2, 1926.

My invention relates to fish cleaning machines, and more particularly to a machine adapted to receive, hold, convey, behead, detail and extract the internals of fish before they are canned, and to do it automatically and rapidly. My improved machine has a traveling conveyor adapted to be driven intermittently and to have the fish placed therein, one by one, in position to be operated upon as the conveyor moves along and the fish is carried to a predetermined position for the various operations, after which the fish is automatically discharged from said conveyor.
In order to fully explain my invention, I have shown one embodiment thereof in the accompanying sheet of drawings which I will now describe.

Figure 1 is a side elevation, partly in section, of a machine embodying my invention; and Figure 2 is a fragmentary view thereof, looking in the direction of the arrow on Fig. 1.
Referring in detail to the drawings, frame members 1, 1, constitute the supporting means for the mechanism, a box for holding the fish to be operated on resting on top of said frame structure and being designated B.
A traveling conveyor 2, having the fish-receiving members, 3, is mounted to travel around sprockets, 4, 4, mounted on shafts 5, 5$^a$, in a supplemental frame 6, here shown to be made of angle iron. The shaft 5 is mounted in an adjustable bearing bracket 7, adapted to be adjusted by means of an adjusting screw 8. The shaft 5$^a$, at the other end of the conveyor 2, is provided with a toothed wheel, 9, on the outer end of the shaft 5$^a$. A swinging yoke 10, having the downwardly extending loop portion 10$^a$, around the under side of said toothed wheel 9, is also mounted on said shaft. An arm 10$^b$ projects downwardly at an angle and is provided with a pawl 11, which rests in the loop 10$^a$ and is adapted to engage the teeth of the wheel 9, operating as a ratchet. An operating rod or pitman 12 is connected to said yoke at its lower end, and at its upper end said rod is connected to a lever 13, pivotally connected and supported in a bracket 14. Said lever 13 is of angle form and its shorter arm 13$^a$ is provided with a roller 15, adapted to be operated by a cam member 16, mounted on a shaft 17, carried in the frame members 6$^a$, 6$^a$. The other end of said yoke 10 is connected to a spring 18, the upper end of which is attached to the structure, as at 19, and operates to return said yoke as released by the cam member 16. This ratchet action is the means for intermittently moving the conveyor which carries the fish one by one to the place of operation.

Mounted on the shaft 17 is a large sprocket 20, over which runs a sprocket chain 21, to a small sprocket 22, on the shaft 23, supported in the frame members 6$^a$, 6$^a$. Also mounted on said shaft 23, is a large driving pulley, 24, having the reduced portion 24$^a$. Said pulley is driven by means of a belt from any suitable source of power running over the larger portion thereof, and from the reduced portion 24$^a$ thereof drives, by means of a cable 25, a pulley 26, on a shaft 27, mounted in said frame structure 6, 6, in the manner shown. The cable 25 runs over an idler pulley 28, supported in the frame.

Mounted on the shaft 27, are two spaced circular knives or saws, 29, 29, positioned at the opposite sides of the fish conveyor, whereby as the conveyor carries the fish forwardly to said cutting members, said cutting members cut the head and tail from the fish.

Mounted on the frame member 6$^a$ is a bearing bracket 30, carrying a short shaft 31, to which is secured a pronged lever or arm 32, the prong of which is adapted to be moved down into the fish as it comes into a predetermined operating position, as shown. Said prong is operated by a cam lever 33, also secured to said shaft 31, and provided at its upper end with a cam roller 34, adapted to engage and be operated by a cam 35, mounted on a shaft 17. The pronged arm 32 is returned to its raised position by means of a spring 36, after it is released by said cam 35.

Mounted on the underside of the frame member 6$^a$, is a supporting bracket 37, in which is mounted a fixed shaft 38. Slidably mounted on said fixed shaft 38 is a cross head 39, having in its lower side a bearing member 40, in which rotates a shaft 41, held against longitudinal movement in said bearing by means of the collars 42, 42. Said shaft 41 is square throughout the greater part of its length and slides through a sleeve 43, rotatably mounted in a bearing 44, held in a hanger 45. The sleeve 43 is provided with a driving pulley 46, operated by a table 47, from a pulley 48, on the shaft 27. Thus said shaft 41 can be moved longitudinally while it is being driven, for a purpose now to be described.

An operating arm 49 is attached at its lower end to said cross head 39, and at its upper end said arm 49 is pivotally connected by means of a swinging link 50, to a fixed bearing 51, on the frame 6ª. Thus said arm and link constitute an elbow structure. Mounted on the side of said arm 49, is a cam roller 52, which is engaged by a cam 53, on the shaft 17, by means of which arm 49 is moved out of its operating position, shown in Fig. 1. Said arm is moved to the operating position by means of a compression spring 54, anchored on the frame 6ª and to said lever or arm 49. Secured to the forward end of the shaft 41 is an extracting screw or auger 55, adapted to enter the fish in the manner indicated, and when withdrawn, in the manner described, to extract from the fish its entrails and leave it clean internally for canning purposes.

Mounted to travel under the conveyor 2, which carries the fish, and under the cutting elements 29, is a conveyor 56, running on the rollers 57, and which may lead to any desired location for depositing the fish after they have been cleaned. The heads and tail pieces fall on the outside of the cutting elements and drop down out of the way.

A shield, 58, is mounted over the upper side of the cutting elements to protect the same and also to protect the operator from the cutting elements.

Thus I have provided a machine which will receive, convey, and hold a fish in position to be cleaned in the manner described, which will automatically cut off the head and tail, and remove the entrails therefrom and discharge the fish on to a conveyor, and do it all automatically and rapidly.

I am aware that changes in the details can be made without departing from the spirit of my invention, and I do not, therefore, limit the invention to the showing made, except as I may be limited by the hereto appended claims.

I claim:

1. In combination with means for holding a fish having its head cut off, a screw-like extractor and means for turning it into the body of the fish and withdrawing it to remove the entrails.

2. In combination, means for holding a fish, means for cutting the head and tail therefrom, and means for automatically entering the body of the fish and removing the entrails.

3. In combination, a conveyor adapted to hold and convey fish one by one, means for intermittently moving said conveyor, means for cutting the head and tail from the body of the fish, and means adapted to be forced into the body of the fish and withdrawn for removing the entrails therefrom.

4. Means for automatically cleaning fish including means for holding a fish, means for cutting its head and tail from the body thereof, and revolving means adapted to enter the fish body and move longitudinally therethrough and longitudinally of the fish and to carry the entrails therefrom.

5. In combination, a conveyor, cutting elements at opposite sides thereof and positioned to cut the head and tail from a fish on said conveyor, means for moving said conveyor, a screw element adapted to be moved longitudinally into the body of the fish, means for automatically inserting, turning and withdrawing said screw element, and means for holding the fish during the operation.

6. In combination, a conveyor adapted to receive and convey a fish, cutting elements adjacent said conveyor for automatically cutting the head and tail therefrom as said fish is carried thereto, a screw-like element mounted to be moved longitudinally into said fish, means for turning said screw-like element and for moving it into and out of said fish body to remove the entrails therefrom, and means for holding the fish on the conveyor during the operation.

7. In a machine of the character referred to, means for holding a fish, means for beheading the same, and means adapted to be inserted longitudinally of itself into the fish to remove the entrails, and mechanism for automatically operating said several means.

Signed at Los Angeles, Los Angeles County, California, this 24th day of May, 1922.

SEVERIN C. ANKER-HOLTH.